United States Patent
Li et al.

(10) Patent No.: US 11,171,365 B2
(45) Date of Patent: Nov. 9, 2021

(54) CAPACITOR-ASSISTED SOLID-STATE BATTERY WITH QUASI-SOLID-STATE ELECTROLYTE

(71) Applicant: GM GLOBAL TECHNOLOGY OPERATIONS LLC, Detroit, MI (US)

(72) Inventors: Zhe Li, Pudong (CN); Dave G. Rich, Sterling Heights, MI (US); Haijing Liu, Shanghai (CN); Dewen Kong, Minhang (CN); Sherman H. Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 16/390,782

(22) Filed: Apr. 22, 2019

(65) Prior Publication Data

US 2020/0036053 A1    Jan. 30, 2020

Related U.S. Application Data

(63) Continuation-in-part of application No. 16/048,427, filed on Jul. 30, 2018.

(51) Int. Cl.
*H01M 10/42* (2006.01)
*H01M 10/0565* (2010.01)
(Continued)

(52) U.S. Cl.
CPC ... *H01M 10/4264* (2013.01); *H01M 10/0525* (2013.01); *H01M 10/0562* (2013.01); *H01M 10/0565* (2013.01)

(58) Field of Classification Search
CPC ......... H01M 10/4264; H01M 10/0525; H01M 10/0562; H01M 10/0565
See application file for complete search history.

(56) References Cited

U.S. PATENT DOCUMENTS

| | | | |
|---|---|---|---|
| 2011/0070504 A1* | 3/2011 | Matsumoto | H01M 10/0525 429/325 |
| 2013/0162216 A1* | 6/2013 | Zhamu | H01G 11/06 320/130 |

(Continued)

OTHER PUBLICATIONS

Nishio et al., "Development of high power density solid-state lithium ion batteries using a quasi-solid state electrolyte containing an ionic liquid," 58th Japan Battery Symposium, (2017) 3C03, pp. 1.

(Continued)

*Primary Examiner* — Jimmy Vo
(74) *Attorney, Agent, or Firm* — Quinn IP Law

(57) ABSTRACT

A capacitor-assisted, solid-state lithium-ion battery is formed by replacing at least one of the electrodes of the battery with a capacitor electrode of suitable particulate composition for the replaced battery particulate anode or cathode material. The solid-state electrodes typically contain quasi-solid-state electrode material and are separated with a layer of quasi-solid-state electrolyte material. In another embodiment the capacitor anode or cathode particles may be mixed with lithium-ion battery anode or cathode particles respectively. Preferably, the battery comprises at least two positively-charged electrodes and two negatively-charged electrodes, and the location, number and compositions of the capacitor material electrode(s) may be selected to provide a desired combination of energy and power.

20 Claims, 4 Drawing Sheets

(51) Int. Cl.
    *H01M 10/0525*    (2010.01)
    *H01M 10/0562*    (2010.01)

(56) References Cited

U.S. PATENT DOCUMENTS

2016/0268627 A1* 9/2016 Lee .................... H01M 10/056
2018/0241079 A1* 8/2018 Duong ................ H01M 4/1395

OTHER PUBLICATIONS

Huang et al., "Quasi-Solid-State Rechargable Lithium-Ion Batteries with a Calix[4] quinone Cathode and Gel Polymer Electrolyte," Angew Chem. Int. Ed. (2013) 52, pp. 9162-9166.

Hanyu et al., "Rechargeable quasi-solid state lithium battery with organic crystalline cathode," Scientific Reports (2012), pp. 1-6.

Yoshima et al., "Thin hybrid electrolyte based on garnet-type lithium-ion conductor Li7La3Zr2O12 for 12 V-class bipolar batteries," Journal of Power Sources 302 (2016), pp. 283-290.

Ferrari et al., "Lithium ion conducting PVdF-HFP composite gel electrolytes based on N-methoxyethylpyrrolidinum bis(trifluoromethanesulfonyl)-imide ionic liquid," Journal of Power Sciences 195 (2010), pp. 559-566.

Matsuo et al., "Bipolar stacked quasi-all-solid-state lithium secondary batteries with output cell potentials of over 6 V," Scientific Reports (2014), pp. 1-5.

* cited by examiner

CAPACITOR-ASSISTED SOLID-STATE BATTERY WITH QUASI-SOLID-STATE ELECTROLYTE

CROSS-REFERENCE TO RELATED APPLICATION(S)

This application is a continuation-in-part of U.S. Ser. No. 16/048,427, titled "Capacitor-Assisted Solid-State Battery, which was filed on Jul. 30, 2018. The complete contents of the aforementioned parent application are herein incorporated by reference.

INTRODUCTION

Lithium-ion batteries can be formed to provide effective energy for powering electric motor-driven automotive vehicles and for powering many other consumer products. Some lithium-ion batteries use liquid electrolytes and others can be prepared with solid electrolytes. For commercial applications, it is necessary or desirable to increase the power densities or power response of such batteries using solid electrolytes. In this disclosure, the power densities or power responses of solid-state batteries are increased by the use of capacitor electrodes containing capacitor active material particles in combinations with battery electrodes in a solid-state capacitor-assisted, lithium-ion battery cell. Further, such benefits are obtained with electrodes containing both capacitor active material particles and particles of battery anode or cathode active materials. The capacitor active material can act as a "buffer" when cell discharge rates are faster than can occur in the battery active materials. The amount of the "buffer" is a function of the amount of capacitor active material used in the cell. These combinations of battery and capacitor at electrode level or active materials level are also used in combination with quasi-solid-state electrolyte materials.

SUMMARY OF THE DISCLOSURE

Solid state lithium-ion batteries have the potential to provide significant improvements in commercial rechargeable battery markets in view of their stability, achievable energy density, safety, and low self-discharge rate. However, the power densities and current-rate delivery capability of such batteries are generally lower than like traditional lithium-ion batteries with liquid electrolytes, especially at low ambient temperatures (e.g., −30° C.), and even at ambient temperatures of 25° C. This is perceived, herein, to be due to the inherently high ionic resistance of solid electrolytes and the unfavorable electrochemical interfaces between solid electrolyte materials and active electrode materials in such solid-state lithium-ion batteries.

The above-identified parent application, U.S. Ser. No. 16/048,427, discloses and claims capacitor-assisted solid-state batteries using a solid-state electrolyte. The subject disclosure generally parallels the parent disclosure but discloses the use of quasi-solid-state electrolyte material in place of the solid-state electrolyte material of the parent disclosure.

The quasi-solid-state electrolyte (sometimes abbreviated as Q-SSE) is typically a mixture of a lithium-ion conducting liquid (i.e., liquid at the intended operating temperature range of the capacitor-assisted battery cell) and particles of a solid component (i.e., solid at the intended operating temperature range of the capacitor-assisted battery cell). The solid component may, for example, be an inorganic solid-state lithium-ion conducting electrolyte such as $Li_7La_3Zr_2O_{12}$ (LLZO). A suitable liquid component for LLZO is a solution of $LiPF_6$ in a mixed solvent of propylene carbonate and dimethyl carbonate. In another example, the solid component may be also a filler material such as oxide ceramic nanoparticles of $SiO_2$, $CeO_2$, $Al_2O_3$ or $ZrO_2$. A suitable companion liquid component is ionic liquid (IL) of lithium bis(trifluoromethanesulfonyl)amide (LiTFSA) in Tetraglyme (G4). In a third example, the particulate solid component may be a lithium-ion-containing salt such as lithium bis(fluorosulfonyl)imide (LiFSI). A more complete disclosure of suitable combinations of solid components and liquid components for Q-SSE material is presented below in this specification.

In a first embodiment, the Q-SSE material is used in the form of a uniform electrolyte layer having a thickness in the range of 2 to 1000 micrometers and of sufficient solid rigidity to be placed under some compaction pressure between opposing layers of solid active electrode materials. In this embodiment, the proportions of the solid phase and the liquid phase are such that Q-SSE electrolyte layer can be formed as a consolidated or resin bonded layer of nanometer to low micrometer size solid particles, each containing dispersed liquid phases. The compositions and proportions of the two phases are such that the two-phase mixed material layer provides specified ionic conductivity, minimal electron conductivity, and retains its physical properties during cell operation.

In another embodiment, particles of the Q-SSE material may be mixed with particles of battery active electrode material or capacitor active electrode material in the formation of an electrode layer which may be bonded to a current collector on one of its sides and place against a layer of Q-SSE electrolyte material on its opposite side. Again, particles of Q-SSE material must have the specified ionic conductivity and physical properties to serve in the mixture with the particles of battery or capacitor electrode active material.

In these embodiments, the Q-SSE particles are formed of a mixture of nanometer or micrometer sized particles of a specified solid compound, each containing dispersed phases of the selected compatible liquid component. The two phases interact and cooperate to enable the suitable conduction of lithium cations to and from both the battery active electrode materials and the capacitor electrode materials. The Q-SSE can enable quick ion adsorbing/desorbing onto/ from capacitor active material while possessing the lithium-ion conduction capability for lithium-ion battery function.

As a non-limiting illustrative example, an individual cell of a solid-state lithium-ion battery may be mainly formed of particles of lithium titanate anode material ($Li_4Ti_5O_{12}$), quasi-solid-state electrolyte particles formed of a mixture of ionic liquid (IL) and lithium salt, such as 0.5M to 2M mixture of lithium bis(fluorosulfonyl) imide salt particles with 1-ethyl-3-methyl imidazolium bis(fluorosulfonyl)imide ionic liquid, and particles of $LiNbo_3$-coated $LiCoO_2$ cathode material. Further, particles of electrode active materials may be mixed with suitable proportions of quasi-solid-state electrolyte particles and/or with some proportions of electrically conductive carbon particles. In some embodiments a polymeric binder is added to the electrode mixtures. Electrode materials are typically formed in layers to one or both sides of a suitably shaped and sized current collector (often a thin aluminum or copper foil). Other suitable electrode active materials and quasi-solid-state electrolyte materials are disclosed below in this specification.

In capacitor-assisted, solid-state battery assemblies, a basic grouping or module of three adjacent and electrically-connected, anode-cathode cells may be used. In addition to battery electrodes, the assemblies include a capacitor anode, a capacitor cathode, or both. Each of the capacitor electrodes may, for example, be formed of particles of activated carbon. Additional capacitor electrode materials are presented below in this specification. Larger cell groups may be prepared for specific applications. It is contemplated that such a hybrid cell and others, with other groupings of assembled battery electrodes and/or capacitor electrode(s), could be prepared with electrode compositions and amounts that could provide a range of battery/capacitor properties including different, useful combinations of energy densities (Wh/kg) and power densities (W/kg) in a hybrid electrochemical cell that adapt the hybrid cell's use in different applications. But in the following illustrative disclosures, the basic lithium-ion battery/capacitor hybrid modules comprise three cells. The assemblies may be bulk-type in the form of sheets of layers of the respective electrode, electrolyte, and current collector members.

In the following illustrative descriptions of these exemplary basic, three cell capacitor/battery assemblies, one should visualize (as illustrated in the attached drawing FIG.s) a side-view of an assembly of vertically-oriented, adjacently stacked, solid electrode and quasi-solid-state electrolyte members comprising four like-shaped, parallel-aligned, current collector foils carrying six layers of electrode materials with three inter-positioned layers of quasi-solid-state solid electrolyte layers. A current collector at each end of the assembly carries an inward-facing layer of lithium-ion battery electrode material or capacitor electrode material. The next inward layer from each end electrode is a layer of quasi-solid-state electrolyte material. These two layers of quasi-solid-state electrolyte particles face an inner current collector coated on each side with a layer of particulate electrode material. The inner-most electrode layers are separated by a third layer of quasi-solid-state electrolyte. Each outside current collector is electrically connected with the further-spaced inner current collector. The first and third current collectors are connected, as are the second and fourth current collectors.

In a first embodiment of a capacitor-assisted, solid-state lithium-ion battery (illustrated in FIG. 1), a two-sided, capacitor electrode (one of either a capacitor anode or capacitor cathode) is incorporated into a three-cell module of four lithium-ion battery electrode layers. A three-cell assembly is formed which includes either a two-side anode electrode or a two-side cathode electrode of lithium-ion capacitor (e.g. activated carbon particles, optionally mixed with particles of a quasi-solid-solid electrolyte) that replaces the corresponding lithium-ion battery anode or cathode. The three-cell assembly then comprises two layers of capacitor anode (or cathode) material on opposite sides of a current collector in an assembly with three electrode layers of battery cathode (or anode) material and one layer of battery anode (or cathode) material. A negative electrode (during cell discharge) of capacitor anode material is electrically connected with a battery anode, or a positive electrode (during cell discharge) of capacitor cathode material is electrically connected with a battery cathode.

In a second embodiment of a capacitor-assisted, solid-state lithium-ion battery, an electric double-layer capacitor (EDLC) is incorporated into a solid-state lithium-ion battery (FIG. 2). The three-cell assembly comprises a positively-charged capacitor cathode electrically connected with a battery cathode, and a negatively-charged capacitor anode electrically connected with a battery anode.

In a third embodiment of a capacitor-assisted, solid-state lithium-ion battery (FIG. 3), one of the inner electrodes is an asymmetric anode electrode or an asymmetric cathode electrode, formed with lithium-ion battery electrode material on one of its sides and a like-charged capacitor electrode material on its opposite side.

And in a fourth embodiment of a capacitor-assisted, solid-state lithium-ion battery (FIG. 4), the capacitor-containing electrodes may be formulated of a mixture of particles of each of capacitor anode (or cathode) material, a compatible battery anode (or cathode) material, and quasi-solid-state electrolyte material.

Further disclosure of these capacitor-assisted solid-state lithium-ion battery embodiments is presented in the following sections of this specification and in the drawing FIG.s.

Viewed, starting from the left side of the figure, is a first lithium-ion capacitor-assisted cell, formed of a current collector with a bonded layer of particulate lithium-ion battery cathode material (dark particles with light dots) mixed with particles of quasi-solid-state electrolyte material (white particles with black dashes and dots), a layer of particulate quasi-solid-state electrolyte material (white particles with black dashes and dots), and a particulate anode layer of activated carbon capacitor material (particles with dense black dots) mixed with particles of quasi-solid-state electrolyte material (white particles with black dashes and dots), bonded to the left side of a second current collector foil. Bonded to the opposite side of the second current collector foil is a particulate anode layer of activated carbon capacitor material particles (particles with dense black dots) mixed with quasi-solid-state electrolyte material (white particles with black dashes and dots). This particulate anodic capacitor layer is part of a second lithium-ion capacitor cell. Placed against the capacitor anode material layer is a particulate layer of quasi-solid-state electrolyte material (white particles with black dashes and dots) followed by a bonded layer of particulate lithium-ion battery cathode material (black particles with white dots) mixed with particles of quasi-solid-state electrolyte material (white particles with black dashes and dots). This layer of cathode material is bonded to one side of a third current collector foil. Bonded to the opposite side of the third current collector foil is a like-layer of particulate lithium-ion cathode material, mixed with quasi-solid-state electrolyte particles, which is part of a third cell—a lithium-ion battery cell. This cell is completed with a layer of particulate quasi-solid-state electrolyte material (white particles with black dashes and dots) and a layer of lithium-ion battery anode material (white particles with organized rows of black dots) bonded to one side of a fourth current collector.

The respective current collectors have tabs extending from their top sides. Starting from the left side of FIG. 1, the first and third current collectors are electrically connected and indicated as positively charged as they would be during discharge of the capacitor-assisted solid-state battery cell module. The second and fourth current collectors are electrically connected and indicated as negatively charged.

Figure 1:
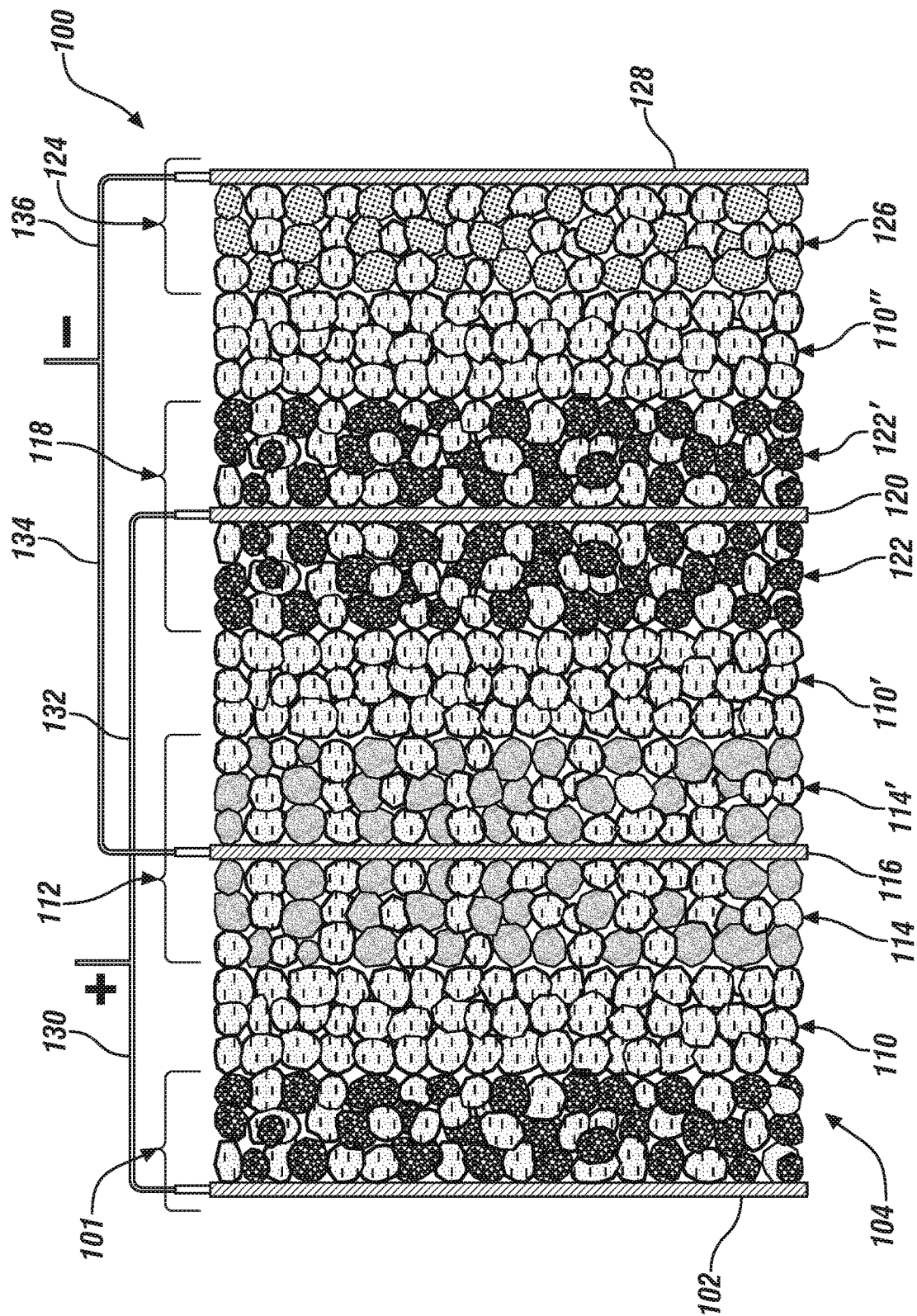
FIG. 1 is a schematic cross-sectional view of the side edges of a three-cell, capacitor-assisted, solid-state, lithium-ion battery incorporating two anode layers of capacitor material, one anode layer of lithium-ion battery material, and three cathode layers of lithium-ion battery material. The respective anode, cathode, and solid electrolyte layers have like rectangular shapes which are not visible in the cross-sectional illustration presented in FIG. 1.
Figure 2:
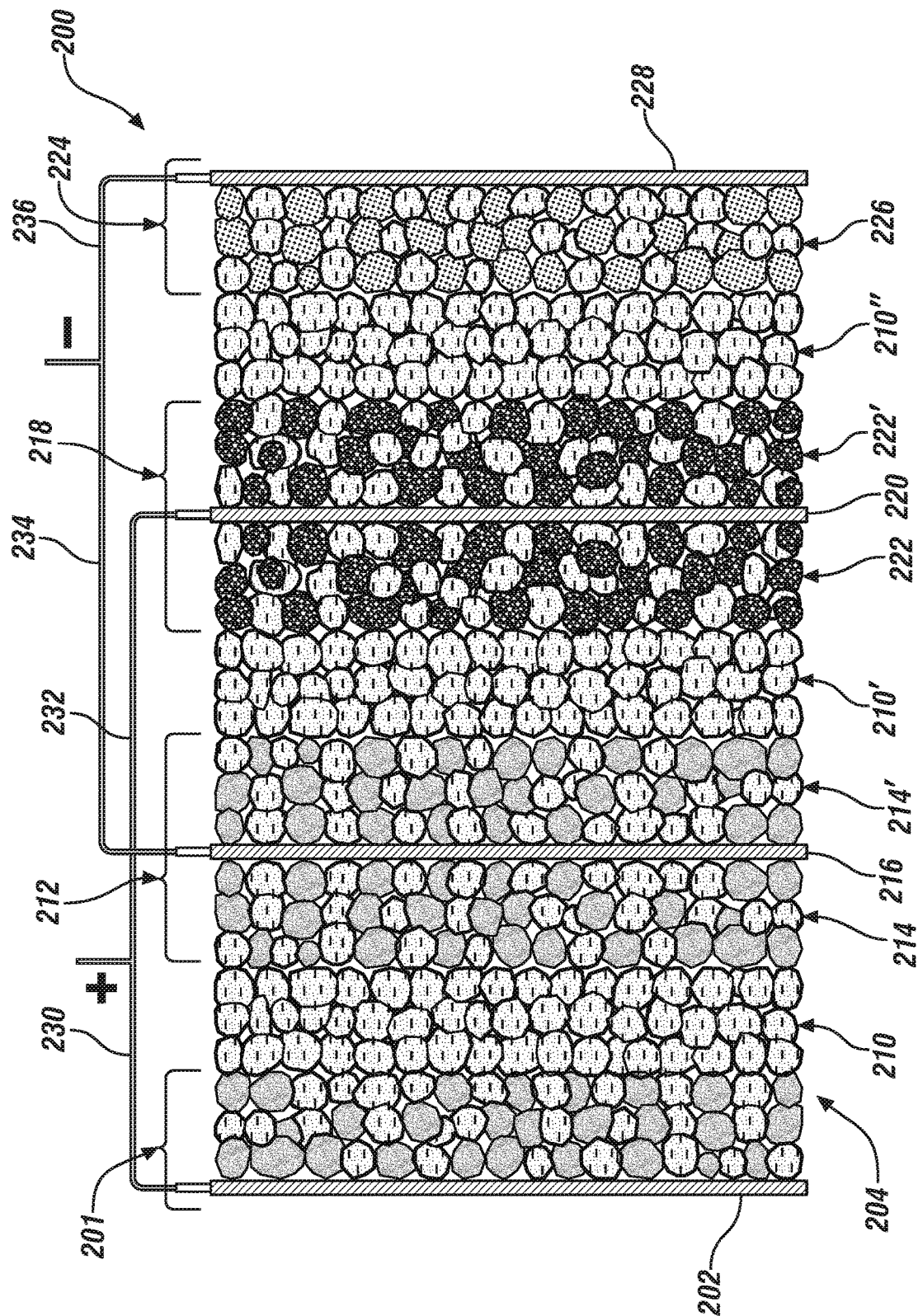

FIG. 2 is a schematic cross-sectional view of the side edges of a three cell, capacitor-assisted, solid state battery incorporating an electric double layer capacitor (EDLC). The respective anode, cathode, and quasi-solid-state electrolyte layers have like rectangular shapes which are not visible in the illustration presented in the side-view illustration of FIG. 2. And the lithium-ion anode and cathode particles, the capacitor electrode particles and the quasi-solid-state electrolyte particles are illustrated as in FIG. 1.

Viewed, starting from the left side of the figure, is an EDLC cell with a positively-charged cathode of capacitor cathode particles mixed with quasi-solid-state electrolyte particles, a layer of quasi-solid-state electrolyte particles and a negatively-charged electrode of capacitor anode particles mixed with quasi-solid-state electrolyte particles. The second cell comprises a lithium-ion capacitor anode opposing a lithium battery cathode. And the third cell is a lithium-ion battery cell (cathode opposing an anode) composed as the third cell in FIG. 1.

Figure 3:
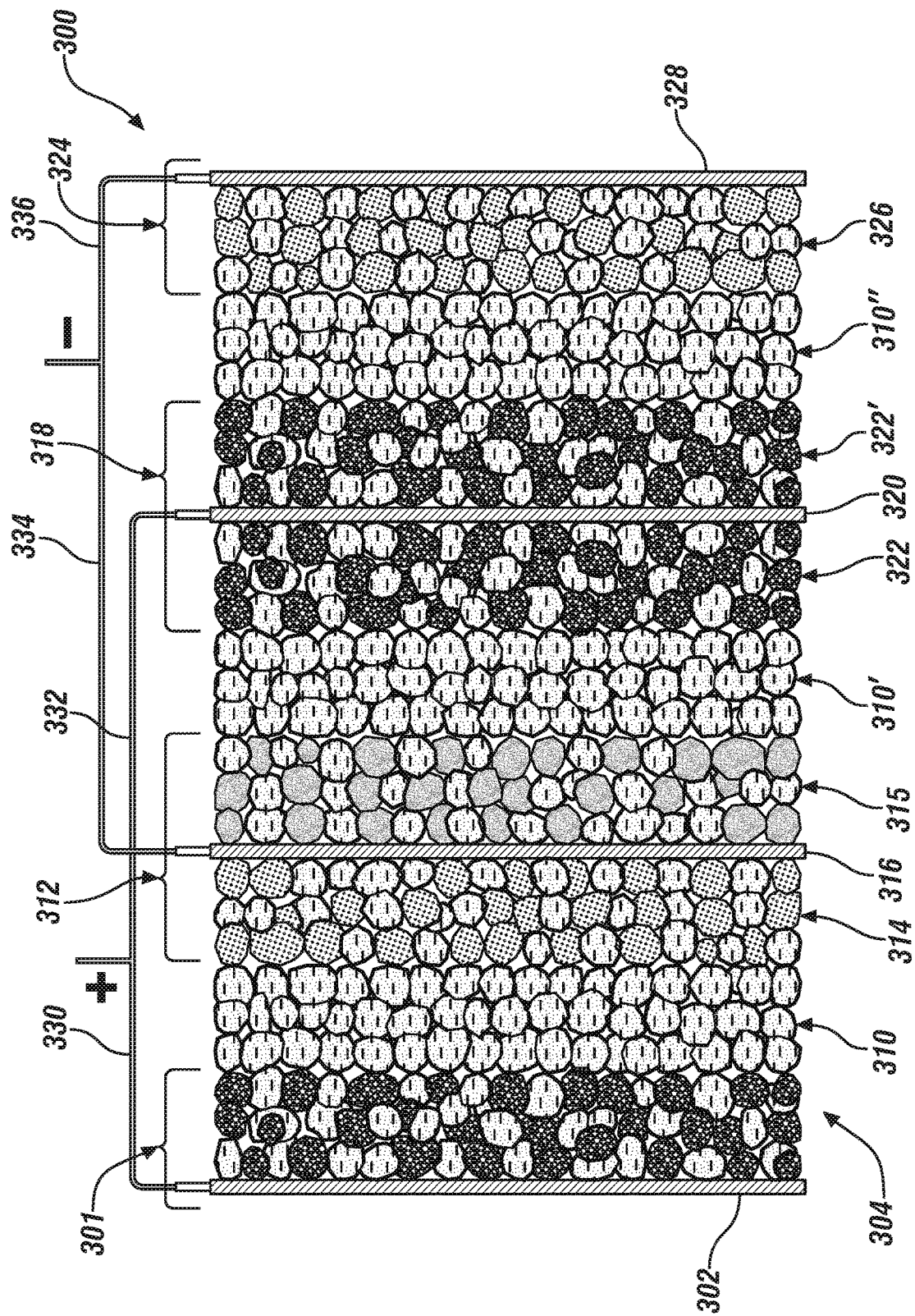

FIG. 3 is a schematic cross-sectional view of the side edges of a three cell, capacitor-assisted, solid state battery incorporating an asymmetric electrode. The respective anode, cathode, and quasi-solid-state electrolyte layers have like rectangular shapes which are not visible in the illustration presented in FIG. 3. The lithium-ion anode and cathode particles, the capacitor electrode particles and the quasi-solid-state electrolyte particles are as illustrated as in FIG. 1.

In FIG. 3, the second current-collector (negatively-charged), as viewed starting from the left side of the figure, carries a layer of particles of lithium-ion anode material, mixed with quasi-solid-state electrolyte particles, bonded to its left side and a layer of particles of capacitor anode active material, mixed with quasi-solid-state electrolyte particles and bonded to its right side.

Figure 4:
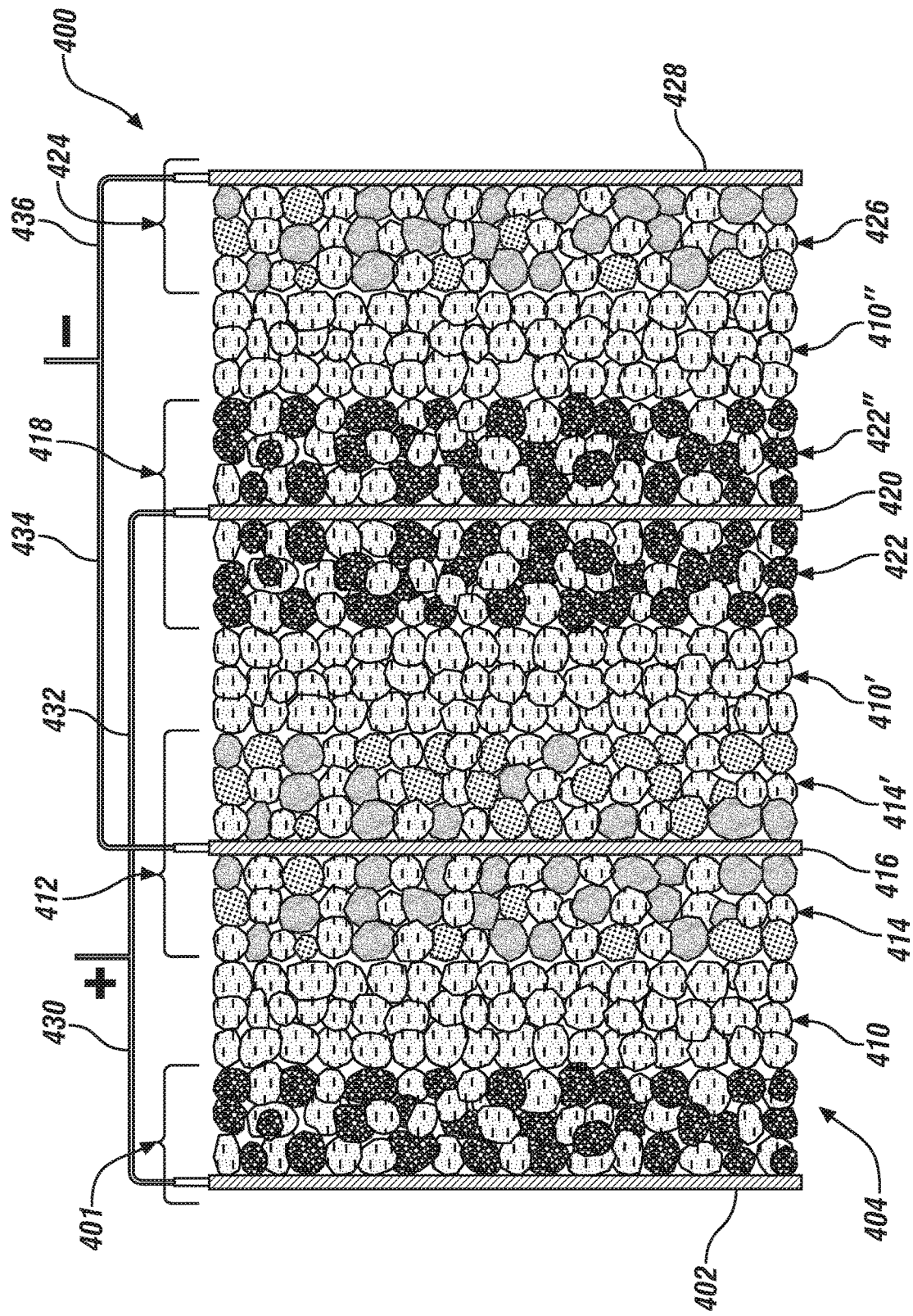

FIG. 4 is a schematic cross-sectional view of the side edges of a three cell, capacitor-assisted, solid-state battery incorporating particles of capacitor material mixed with particles of battery material in layers of electrode material. The respective anode, cathode, and quasi-solid-state electrolyte layers have like rectangular shapes which are not visible in the illustration presented in FIG. 4.

In FIG. 4, both electrode material layers of the second electrode as viewed from the left side of the figure, a negative electrode, are mainly formed of a mixture of lithium-ion battery anode active material particles, capacitor anode active material particles, and particles of a quasi-solid-state electrolyte. The respective particles of battery electrode materials, capacitor electrode materials, and quasi-solid-state electrolyte particles are illustrated as in FIGS. 1-3.

DETAILED DESCRIPTION

In accordance with this disclosure, capacitor-assisted, solid-state, lithium-ion batteries are provided comprising various combinations of battery anodes, battery cathodes, capacitor anodes, capacitor cathodes, and quasi-solid-state electrolytes.

The lithium-ion battery anodes and capacitor anodes are typically formed of closely-packed, layers of anode active material particles mixed with quasi-solid-state electrolyte particles. Depending on the composition of the quasi-solid-state electrolyte, the anode mixtures may contain a conductive additive such as conducive-carbon particles (e.g., acetylene black) and a polymeric binder (e.g., styrene butadiene styrene copolymer) that could enable a good mechanical property and good adhesion between current collectors and particles. The anode layers may display some porosity. The anode layer typically has a two-dimensional rectangular shape and size with a uniform thickness. One side of the anode layer is suitably attached or bonded (or the like) to one side of a current collector foil (typically a copper current collector foil that is shaped to cover the surface of the attached anode layer and with a tab extending outwardly for electrical connection with other electrodes in a group of electrodes and cells). The other side of the anode layer faces an overlying, like-shaped, layer of quasi-solid-state electrolyte particles. Facing the other side of the layer of electrolyte particles is a coextensive layer of a like-shaped battery or capacitor cathode.

The cathode is typically formed of a layer of battery or capacitor cathode active material particles mixed with some quasi-solid-state electrolyte particles. Depending on the composition of the quasi-solid-state electrolyte, the cathode mixtures may contain a conductive additive such as conducive-carbon particles (e.g., acetylene black, sometimes AB in the following text) and a polymeric binder (e.g., styrene butadiene styrene copolymer, polytetrafluoroethylene (PTFE) or polyvinylidene fluoride (PVdF)) that could enable a good mechanical property and good adhesion between current collectors and particles. The cathode layers may display some porosity. The other side of the cathode layer is bonded to one side of a current collector foil (typically an aluminum current collector foil that is shaped to cover the surface of the facing cathode layer and with a tab (sometimes covered) for electrical connection with other electrodes in a group of cells). Thus, the electrolyte layer has a two-dimensional shape that suitably electrochemically and coextensively contacts the anode layer on one of its sides and the cathode layer on its other side.

The anode and cathode of the battery/capacitor cell are composed, sized and shaped to provide a predetermined capacity for the cell. The battery electrodes contribute to the overall energy and power density of the cell while the capacitor electrodes are composed to provide a quick power response and improve the power performance when it is required.

Examples of lithium-ion battery cathode active materials comprise $LiFePO_4$, $LiMn_2O_4$, $LiCoO_2$, $LiNi_{0.5}Mn_{1.5}O_4$, lithium nickel cobalt manganese oxide (NCM), lithium nickel cobalt aluminum oxide (NCA) and other lithium transition-metal oxides. A further example of a lithium-ion battery cathode material is $LiNbO_3$-coated $LiCoO_2$. In the following examples a solid-state lithium-ion battery cathode may comprise a suitable active cathode material, a quasi-solid-state electrolyte, a conductive additive (e.g. conductive carbon particles), and a binder (if needed). Preferably, the proportion of active cathode material is greater than about 30 wt. % of the total cathode material mixture and the proportion of quasi-solid-state electrolyte (Q-SSE) is preferably lower than about 60 wt. % of the total cathode material. Sometimes, no Q-SSE addition into the electrode is also feasible. In this case, the liquid component in the Q-SSE may be applied to wet the electrode and enhance the Li-ion conducting within the electrode. The ratio of conductive additive should be lower than about 20 wt. % of the total cathode material.

Examples of suitable lithium-ion battery anode active materials comprise: carbonaceous material (e.g. graphite, hard carbon, soft carbon etc.), silicon, silicon-carbon blended material (silicon-graphite composite), $Li_4Ti_5O_{12}$, transition-metal (alloy types, e.g., Sn), metal oxide/sulfide (e.g., $SnO_2$, FeS and the like). Also, suitable lithium-ion battery anode active materials include Li metal and Li-metal alloys (e.g., Li—In).

In the following examples a solid-state lithium-ion battery anode may comprise a suitable anode active material, a quasi-solid-state electrolyte, a conductive additive (e.g. conductive carbon particles), and a binder (if needed). Preferably, the proportion of active anode material is greater than about 30 wt. % of the total anode material mixture and the proportion of quasi-solid-state electrolyte (SE) is lower than about 60 wt. % of the total anode material. Sometimes, no Q-SSE addition into the electrode is also feasible. In this case, the liquid component in Q-SSE may be applied to wet the electrode and enhance the Li-ion conducting within the electrode. The ratio of conductive additive should be lower than about 20 wt. % of the total anode material.

Examples of suitable capacitor cathode active material comprise activated carbon, graphene, carbon nanotubes, other porous carbon materials, a conducting polymer (e.g. polyethylenedioxythiophene). A solid-state capacitor electrode may be formed of a mixture of capacitor active material (e.g. activated carbon), quasi-solid-state electrolyte (if needed), conductive additive (e.g. acetylene black), and binder (if needed).

Examples of a suitable capacitor anode active material comprise activated carbon, soft carbon, hard carbon, and metal oxide/sulfide (e.g., $TiO_2$). A solid-state capacitor electrode may be formed of a mixture of capacitor active material (e.g. activated carbon), quasi-solid-state electrolyte (if needed), conductive additive (e.g. AB), and binder (if needed).

Four related types of quasi-solid-state electrolyte materials may be used in the capacitor-assisted solid-state battery.

A first example of a Q-SSE uses an ionic liquid mixed with a compatible lithium salt. The selected lithium salt is dispersed into the ionic liquid to form a quasi-solid mixture. An example of suitable ionic liquid is 1-ethyl-3-methyl imidazolium bis(fluorosulfonyl) imide (EMIFSI). An example of a lithium salt solid component is lithium bis (fluorosulfonyl) imide (LiFSI). A 0.5 M-2 M solution of the LiFSI salt in the EMIFSI liquid is suitable. A 1M LiFSI in EMIFSI forms a quasi-solid state. A suitable binder such as polytetrafluoroethylene (e.g., up to about 10 wt. %) may be used to bind the Q-SSE particles in a suitably ionically conductive electrolyte layer. In addition to forming electrolyte layers, depending on the intended properties of the capacitor-assisted lithium battery cell, these Q-SSE particles may also optionally be mixed with particles of capacitor or battery electrode materials in the formation of electrodes.

A second embodiment of a Q-SSE uses a mixture of a lithium-ion conducting liquid with nanoparticles of, for example, silica. In a first example of this embodiment, the liquid component is a 1 M solution of lithium bis(trifluoromethyl sulfonyl) imide Li[Tf2N] in 1-ethyl-3-methyl imidazolium bis (trifluoromethyl sulfonyl) imide. The ionic liquid typically constitutes about 30 to 90 vol. % of the Q-SSE in the mixture with the nanoparticles. A binder such as polytetrafluoroethylene may also be employed in the preparation of the Q-SSE material as an electrolyte layer. Particles of this Q-SSE material may also be mixed with solid electrode particles to prepare the electrode.

In a second example of the second embodiment Q-SSE material, the liquid component may be a mixture of lithium bis(trifluoromethyl sulfonyl) imide and tetraglyme.

In a third embodiment of a suitable Q-SSE, an organic-inorganic hybrid electrolyte is formed. The organic liquid component is a lithium-ion conducting organic electrolyte such as a 1.2 M solution of lithium hexafluoro phosphate ($LiPF_6$) in a mixed solvent of propylene carbonate and dimethyl carbonate (1:2 in volume). The inorganic solid component is an inorganic solid electrolyte such as $Li_7La_3Zr_2O_{12}$ (LLZO) or $Li_{1+x}Al_xGe_{2-x}(PO_4)_3$ (LAGP). Another suitable solid component is a lithium-ion conduction enabling polymer such as polyacrylonitrile (PAN) and polyethylene oxide (PEO). Suitably, the solid electrolyte component constitutes about 50-99 wt. % of the base Q-SSE composition. A minor amount of a suitable binder such as polyvinylidene fluoride may be used to bind the particles of Q-SSE electrolyte in an electrolyte layer. Optionally, particles of this particulate Q-SSE composite may also be mixed with particles of suitable anode or cathode particles in the formation of an electrode layer to be assembled in face-to-face contact with the Q-SSE electrolyte layer.

In a fourth embodiment of a suitable Q-SSE, a polymer is combined with an organic electrolyte. In a first example the liquid component is a lithium ion conducting solution such as a 0.7 M solution of $LiClO_4$ in dimethyl sulfoxide. The solid component is a co-polymer for example, poly (methyl acrylate) with poly (ethylene glycol). A suitable amount of a filler, such as silica, may be also included with the solid component of the Q-SSE. The liquid organic electrolyte suitably comprises 40 to 80 wt. % of the mixture and the solid polymer about 20 to 60 wt %. Optionally, particles of this particulate Q-SSE composite may also be mixed with particles of suitable anode or cathode particles in the formation of an electrode layer to be assembled in face-to-face contact with the Q-SSE electrolyte layer.

In another example of the fourth embodiment, the liquid component is solution of lithium bis(trifluoromethanesulfonyl) imide dissolved in [N-ethyl(methyl ether)-N-methyl pyrrolidinium trifluoromethane sulfonimide][bis(trifluoromethanesulfonyl)imide] ionic liquid. Again, the solid component is a polymer such as poly (vinylidene fluoride) copolymer mixed with hexafluoropropylene. A suitable amount of a filler, such as silica, may be also included with the solid component of the Q-SSE. The liquid organic electrolyte suitably comprises 40 to 90 wt. % of the mixture and the solid polymer about 10 to 50 wt. %. Optionally, particles of this particulate Q-SSE composite may also be mixed with particles of suitable anode or cathode particles in the formation of an electrode layer to be assembled in face-to-face contact with the Q-SSE electrolyte layer.

FIG. 1 is a schematic cross-sectional view of the side edges of a first embodiment of a three-cell, capacitor-assisted, solid-state battery 100. The respective electrode members and quasi-solid-state electrolyte members have like rectangular shapes which are not visible in the illustration presented in FIG. 1. An example of the dimensions of a representative rectangular cross section are 50 mm by 55 mm. In general, the thickness of the electrode layers may be from dozens to hundreds of micrometers and the thickness of the quasi-solid-state electrolyte layers is usually in the range from several micrometers to hundreds of micrometers. The sizes of the generally spherical electrode and electrolyte particles are typically about 100 nm to 50 um. As will be described in the following paragraphs, the two-dimensional shapes and dimensions of the electrode members are determined to enable them to fit substantially face-to face in an assembled cell of required function and capacity/energy. And the respective thicknesses of the electrode bodies and electrolyte bodies are based on their required functions and capacities or energy densities in the assembled cells.

Starting from the left side of FIG. 1 is shown a cathode electrode 101 formed of a particulate layer of lithium-ion battery cathode material 104 of substantially uniform thickness (e.g. in the range of about 10 to 1000 micrometers), bonded substantially co-extensively to a major face of a rectangular current collector foil 102, suitably an aluminum foil having a uniform thickness in the range of about five to 50 micrometers. While most of the surface of current collector foil is covered with the battery cathode material 104, a tab (coated or un-coated) or like connection-portion at one side (the top edge in FIG. 1 and the following figures) of the current collector is provided to facilitate electrical connection through electrical connection 130 with another cathode electrode 118.

In this embodiment, the lithium-ion battery cathode material 104 is mainly formed of a mixture of particles of active cathode material (dark particles with white dots) and particles of quasi-solid-state electrolyte material (white particles with black dashes and dots). As stated, an example of a suitable particulate cathode material is lithium niobium oxide ($LiNbO_3$)-coated lithium cobalt oxide ($LiCoO_2$). And an example of a quasi-solid-state electrolyte material is a mixture of lithium bis(trifluoromethanesulfonyl)amide (LiTFSA)-tetraglyme (G4) ionic liquid (IL, 75 vol. %) and $SiO_2$ nanoparticles (25 vol. %)).

Placed coextensively against the flat surface of cathode material layer 104 of cathode electrode 101 is the co-extensive and compatible flat surface of a particulate, quasi-solid-state electrolyte 110 in which particles (white particles with black dashes and dots) of a suitable electrolyte composition are suitably consolidated in a quasi-solid-state electrolyte body. This quasi-solid-state electrolyte layer 110, sometimes, may be formed of a mixture of quasi-solid-state electrolyte and a suitably small amount of polymeric binder (e.g., polytetrafluoroethylene), where the addition of the binder is to obtain suitable mechanical properties. Particles of the same quasi-solid-state electrolyte material may be used in each layer of electrode material and each electrolyte layer in the cells of this embodiment of the disclosure.

Lying face-to-face against solid-electrolyte body 110 is a like-shaped layer of capacitor anode material 114, suitably bonded to one side of current collector foil 116. Current collector foil 116 is suitably formed of copper having a thickness in the range of five to 50 micrometers. An example of suitable capacitor anode material is a mixture of activated carbon particles (gray dotted particles) with a smaller proportion of quasi-solid-state electrolyte particles (white particles with black dashes and dots). Capacitor anode material layer 114 is a part of anode electrode 112. Anode electrode 112 comprises capacitor anode material layer 114 bonded to the left side of current collector foil 116 and a like-layer 114' of capacitor anode material bonded to the right side of current collector foil 116.

A layer of quasi-solid-state electrolyte material 110' (light particles with black dashes and dots) is assembled with one of its rectangular surfaces lying against the outer surface of capacitor anode material layer 114'. Placed against the right-side surface of quasi-solid-state electrolyte material 110' is a layer of particulate lithium-ion battery cathode material 122, which is part of cathode electrode 118. Cathode electrode 118 also comprises an aluminum current collector 120 with a second layer of lithium-ion battery cathode electrode material 122' bonded to its opposing major surface. The compositions of lithium-ion battery cathode material layers 122, 122' are like, and are schematically illustrated like the cathode materials of battery cathode electrode 104.

Quasi-solid-state electrolyte layer 110" is placed against the surface of cathode material layer 122'. And a layer of anode material 126 bonded to copper current collector 128 is placed against the right-side surface of quasi-solid-state electrolyte layer 110". The anode material 126 is a mixture of particles of lithium-ion battery anode material (white with an organized pattern of black dots) and particles of quasi-solid-state electrolyte (white particles with black dashes and dots).

The assembly of the capacitor-assisted solid-state battery 100 embodiment of FIG. 1 is completed with the electrical connections 130, 132 between the cathodes 101, 118, which are positively-charged during discharge of the capacitor-assisted battery 100, and with electrical connections 134, 136 between the capacitor anode 112 and the battery anode 124 which are negatively charged during discharge of the capacitor-assisted battery.

In the schematic illustration of FIG. 1, the respective electrodes are enlarged for purposes of illustration of the mixed electrode materials and their positioning in the assembled three-cell, capacitor-assisted battery. In an application for such a capacitor-assisted battery, the electrodes would be sized and shaped to provide a specified combination of energy requirement and power requirement in the capacitor assisted battery. In many assembled electrochemical cells, such basic cell units may be repeated as a hybrid cell unit and/or combined with additional battery cell units in order to achieve a desired combination of battery properties and capacitor properties.

In the embodiment of FIG. 1, a two-sided anode 112 of capacitor material was used in combination with a battery anode 124. The cathode members 101,118 of the assembly were mainly formed of cathode active material for a lithium-ion battery. In a reverse embodiment of the FIG. 1 assembly, capacitor materials could be selected for use in a two-sided capacitor cathode which would be electrically connected with a battery material cathode and used in electrically-opposed combination with lithium-ion battery material anodes.

Unless otherwise stated, the schematic illustrations of lithium-ion anode particles and cathode particles and capacitor electrode particles are the same in the following figures as they were illustrated in FIG. 1.

In the embodiment of FIG. 2, an electric double-layer capacitor (EDLC) is incorporated into the capacitor-assisted, solid-state battery assembly 200.

Capacitor cathode 201 is formed of a suitable current collector foil 202 carrying a uniform layer 204 of a mixture of capacitor cathode active material particles and quasi-solid-state electrolyte particles. Quasi-solid-state electrolyte layer 210 separates capacitor cathode 201 from capacitor anode electrode 212. Capacitor anode 212 is formed of current collector foil 216 carrying layers of capacitor anode material 214, 214' bonded to opposite major faces of the current collector 216. Each layer of capacitor anode material 214, 214' is formed of a mixture of capacitor anode particles (e.g., activated carbon particles) and particles of quasi-solid-state electrolyte. Lying against capacitor anode material layer 214' of the capacitor anode 212 is quasi-solid-state electrolyte layer 210'. The balance of the three-cell capacitor-assisted solid-state battery assembly is like the assembly illustrated in FIG. 1.

Quasi-solid-state electrolyte layer 210' separates capacitor anode 212 from battery cathode 218. Battery cathode 218 is formed of copper current collector foil 220 carrying opposing layers of cathode material 222, 222'. Each layer of cathode material 222, 222' is mainly formed of a mixture of particles of a suitable lithium-ion battery cathode active material and quasi-solid-state electrolyte particles. Quasi-solid-state electrolyte layer 210" separates battery cathode 218 from lithium-ion battery anode 224. Battery anode 224 is formed of a copper current collector foil 228 carrying a layer of anode material 226 bonded to the left side (or both sides) of current collector foil 228. The layer of anode material 226 is mainly formed of a mixture of particles of a suitable lithium-ion battery anode material (for example, $Li_4T_{15}O_{12}$) mixed with quasi-solid-state electrolyte particles.

The assembly of the capacitor-assisted solid-state battery 200 embodiment of FIG. 2 is completed with the electrical connections 230, 232 between the cathodes 201, 218, which are positively-charged during discharge of the capacitor-assisted battery 200, and with electrical connections 234, 236 between the capacitor anode 212 and the battery anode 224 which are negatively charged during discharge of the capacitor-assisted battery.

The incorporation of the electric double-layer capacitor members into the battery cells may be utilized to significantly increase the power performance/response of the capacitor-assisted, solid-state battery assembly.

FIG. 3 illustrates a capacitor-assisted, solid-state battery embodiment 300 which utilizes an asymmetric electrode 312 formed of a layer of lithium-ion battery anode material fixed on one side of a current collector and a layer of capacitor anode material on the other side of the current collector. This asymmetric anode electrode embodiment is illustrated in FIG. 3. Alternatively, an analogous asymmetric cathode electrode may be used.

Cathode electrode 301 is formed of a layer of battery cathode material 304 attached to aluminum current collector foil 302. Battery cathode material 304 is mainly formed of a mixture of particles of lithium-ion battery cathode active material with a suitable proportion of quasi-solid-state electrolyte particles. Placed against the cathode layer material 304 is a layer of quasi-solid-state electrolyte particles 310. Asymmetric anode electrode 312 is positioned against quasi-solid-state electrolyte layer 310. Asymmetric anode electrode 312 is formed of a copper foil current collector 316 carrying a layer of battery anode material particles 314 on its left face and a layer of capacitor anode materials 315 on its right face. The layer of battery anode material particles 314 comprises a particulate mixture of suitable lithium-ion battery anode active particles mixed with a suitable portion of quasi-solid-state electrolyte material. The layer of capacitor anode material 315 comprised a mixture of suitable capacitor anode material (e.g., activated carbon particles) and quasi-solid-state electrolyte particles. The rest of the three-cell, capacitor-assisted, solid state battery assembly is the same as illustrated in FIG. 1.

Quasi-solid-state electrolyte layer 310' separates asymmetric capacitor/battery anode 312 from battery cathode 318. Battery cathode 318 is formed of copper current collector foil 320 carrying opposing layers of cathode material 322, 322'. Each layer of cathode material 322, 322' is mainly formed of a mixture of particles of a suitable lithium-ion battery cathode active material and quasi-solid-state electrolyte particles. Solid electrolyte layer 310" separates battery cathode 318 from a battery anode 324. Battery anode 324 is formed of a copper current collector foil 328 carrying a layer of anode material 326 bonded to the left side (or both sides) of current collector foil 328. The layer of anode material 326 is mainly formed of a mixture of particles of a suitable lithium-ion battery anode material (for example, $Li_4T_{15}O_{12}$) mixed with a proportion of quasi-solid-state electrolyte particles.

The assembly of the capacitor-assisted solid-state battery 300 embodiment of FIG. 3 is completed with the electrical connections 330, 332 between the cathodes 301, 318, which are positively-charged during discharge of the capacitor-assisted battery 300 and with electrical connections 334, 336 between the capacitor/battery anode 312 and the battery anode 324 which are negatively charged during discharge of the capacitor-assisted battery.

FIG. 4 illustrates a capacitor-assisted solid-state battery 400 in which either each anode or each cathode (or both anode and cathode) is formed (largely) of a mixture of capacitor material particles, lithium-ion battery electrode active material particles, and quasi-solid-state electrolyte particles. In the embodiment illustrated in FIG. 4, capacitor anode material particles are mixed with lithium-ion battery anode material particles, and quasi-solid-state electrolyte material particles. The embodiment illustrated in FIG. 4 uses quasi-solid-state electrolyte particles.

Cathode electrode 401 is formed of a layer of battery cathode material 404 attached to aluminum current collector foil 402. Battery cathode material 404 is formed substantially of a mixture of particles of lithium-ion battery cathode active material (dark particles with white spots) with a suitable proportion of quasi-solid-state electrolyte particles (white particles with black dashes and dots). Placed against the cathode layer material 404 is a layer of quasi-solid-state electrolyte particles 410 (white particles with black spots).

Mixed battery/capacitor anode electrode 412 is positioned against solid electrolyte layer 410. Anode electrode 412 is formed of a copper foil current collector 416 carrying a layer of mixed battery anode and capacitor anode active material particles, with quasi-solid-state electrolyte particles, 414 on its left face and a like layer of battery anode materials/capacitor anode materials/quasi-solid-state electrolyte particles 414' on its right face. Each layer of anode material particles 414, 414' comprises a particulate mixture of suitable lithium-ion battery anode active material (white particles with rows and columns of black dots), suitable capacitor anode material (black dotted particles), and a suitable portion of quasi-solid electrolyte material (white particles with black dashes and dots). The proportions of battery and capacitor anode particles is determined by the required properties of the electrode.

Quasi-solid-state electrolyte layer 410' separates mixed battery/capacitor anode 412 from lithium-ion battery cathode 418. Battery cathode 418 is formed of copper current collector foil 420 carrying opposing layers of cathode material 422, 422'. Each layer of cathode material 422, 422' is formed substantially of a mixture of particles of a suitable lithium-ion battery cathode active material (black particles with white dots) and quasi-solid-state electrolyte particles (white particles with black dashes and dots). Solid electrolyte layer 410" separates battery cathode 418 from a battery/capacitor anode 424. Mixed battery/capacitor anode 424 is formed of a copper current collector foil 428 carrying a layer of battery/capacitor mixed material 426 bonded to the left side (or both sides) of current collector foil 428. The layer of anode material 426 is formed of a mixture of particles of a suitable lithium-ion battery anode material (for example, $Li_4T_{15}O_{12}$, white particles with organized black dots), capacitor anode active material particles (e.g., activated carbon particles, (gray particles), and further, with a suitable proportion of quasi-solid-state electrolyte particles (white particles with black dashes and dots).

The assembly of the capacitor-assisted solid-state battery 400 embodiment of FIG. 4 is completed with the electrical connections 430, 432 between the cathodes 401, 418, which are positively-charged during discharge of the capacitor-assisted battery 400 and with electrical connections 434, 436 between the capacitor anode 412 and the battery anode 424 which are negatively charged during discharge of the capacitor-assisted battery.

This invention has been illustrated with some examples which are not intended to be limiting of the scope of the invention.

The invention claimed is:

1. A capacitor-assisted, solid-state lithium-ion battery comprising:
    a first electrode comprising two layers of electrode material particles bonded to opposite sides of a first current collector foil, one layer of the two layers of electrode material particles comprising capacitor electrode material particles and another layer of the two layers of electrode material particles comprising capacitor material particles and/or lithium-ion battery electrode material particles, each layer of the two layers of electrode material particles being mixed with particles of a quasi-solid-electrolyte;
    a second electrode similarly shaped with and parallel to the first electrode and facing the another layer of electrode material particles comprising the capacitor electrode material particles, the second electrode including an electrode material layer bonded to a second current collector foil and comprising particles of capacitor electrode material and/or of battery electrode material of the opposite electrical charge; and
    a layer of quasi-solid-state electrolyte separating and abutting coextensive surface areas of the first and second electrodes, the layer of quasi-solid-state electrolyte including a lithium-ion conducting ionic liquid containing particles of a lithium-ion conducting inorganic solid-state electrolyte.

2. The capacitor-assisted, solid-state lithium-ion battery of claim 1, in which the two layers of the first electrode comprises two like layers of the capacitor electrode material particles mixed with the particles of the quasi-solid-state electrolyte, and each of the layers of the capacitor electrode material particles faces like-shaped layers of the lithium-ion battery electrode material of opposite electrical charge, the layers of the capacitor electrode material particles and the layers of the lithium-ion battery electrode material being separated by a layer of the quasi-solid-state electrolyte.

3. The capacitor-assisted, solid-state lithium-ion battery of claim 1, in which the two layers of the first electrode comprises two like layers of the capacitor electrode material particles mixed with the particles of the quasi-solid-state electrolyte, one layer of the capacitor electrode material particles facing a like-shaped layer of the capacitor electrode material particles of opposite electrical charge and the opposing layer of the capacitor electrode material particles facing a like-shaped layer of lithium-ion battery material of opposite electrical charge, the facing layers of electrode materials being separated by a layer of the quasi-solid-state electrolyte.

4. The capacitor-assisted, solid-state lithium-ion battery of claim 1, in which the two layers of the first electrode comprises one layer of the capacitor electrode material particles mixed with the particles of the quasi-solid-state electrolyte and an opposing layer of like-electrically charged lithium-ion battery electrode material, each of the layers of electrode material of the first electrode facing a like-shaped layer of the lithium-ion battery electrode material of the same composition and of opposing electrical charge with respect to the electrode material layers of the first electrode, the facing layers of electrode materials being separated by a layer of the quasi-solid-state electrolyte.

5. The capacitor-assisted, solid-state lithium-ion battery of claim 1, in which the two layers of the first electrode comprises two like layers of the capacitor electrode material particles mixed with (i) the particles of lithium-ion battery electrode material of the same intended electrical charge and (ii) with the particles of the quasi-solid-state electrolyte, each of the layers of the capacitor/battery electrode material mixture facing like-shaped layers of lithium-ion battery electrode material of opposite electrical charge in the operation of the battery, the facing layers of electrode materials being separated by a layer of the quasi-solid-state electrolyte.

6. A capacitor-assisted, solid-state lithium-ion battery comprising:
    a capacitor electrode;
    a battery anode electrode;
    a battery cathode electrode;
    at least three layers of quasi-solid-state electrolyte; and
    first, second, third and fourth like-shaped, mutually parallel current collector foils assembled with the first and fourth current collector foils as outer-positioned current collectors sandwiching therebetween the second and third current collector foils as inner-positioned current collectors, each of the current collector foils having two opposing surfaces,
    wherein the inner-positioned current collector foils each has a first layer of particles of electrode material bonded to each of the opposing surfaces, and the outer-positioned current collector foils each has a second layer of particles of electrode material bonded to at least inward-facing ones of the opposing surfaces,
    wherein each of the first layers of particles of electrode material faces another one of the first layers or one of the second layers of particles of electrode material in a paired arrangement;
    wherein each of the first and second layers of particles of electrode materials abuts a coextensive surface area of one of the layers of quasi-solid-state electrolyte,
    wherein the first and third current collector foils are electrically connected to serve as the battery cathode electrode during discharge of the capacitor-assisted, solid-state lithium-ion battery, and the second and fourth current collector foils are electrically connected to serve as the battery anode electrode during discharge of the capacitor-assisted, solid-state lithium-ion battery;
    wherein at least one layer of the first and second layers of particles of electrode material includes a layer of capacitor anode material particles mixed with quasi-solid-state electrolyte and/or a layer of capacitor cathode material particles mixed with quasi-solid-state electrolyte, and
    wherein the at least three layers of quasi-solid-state electrolyte conduct lithium ions into and from each of the capacitor anode material particles and/or capacitor cathode material particles and the first and/or second layers of particles of electrode material, each of the at least three layers of quasi-solid-state electrolyte including a lithium-ion conducting ionic liquid containing particles of a lithium-ion conducting inorganic solid-state electrolyte.

7. The capacitor-assisted, solid-state lithium-ion battery of claim 6, in which the layer of capacitor anode material particles is mixed with lithium-ion battery anode material particles.

8. The capacitor-assisted, solid-state lithium-ion battery of claim 6, in which the layer of capacitor cathode material particles is mixed with lithium-ion battery cathode material particles.

9. The capacitor-assisted, solid-state lithium-ion battery of claim 6, in which the layer of capacitor anode material particles is mixed with a quasi-solid-state electrolyte material including a mixture of a lithium-ion conducting liquid containing particles of lithium-ion conducting solid-state electrolyte, and the first and/or second layers of particles of electrode material are mixed with the quasi-solid-state electrolyte material.

10. The capacitor-assisted, solid-state lithium-ion battery of claim 6, in which the layer of capacitor cathode material particles is mixed with a quasi-solid-state electrolyte material including a mixture of a lithium-ion conducting liquid containing particles of lithium-ion conducting solid-state electrolyte, and the first and/or second layers of particles of electrode material are mixed with the quasi-solid-state electrolyte material.

11. The capacitor-assisted, solid-state lithium-ion battery of claim 6, in which the capacitor electrode includes a capacitor anode comprising the layer of capacitor anode material particles mixed with quasi-solid-state electrolyte material particles bonded to the opposing sides of one of the second and third current collector foils.

12. The capacitor-assisted, solid-state lithium-ion battery of claim 6, in which the capacitor electrode includes a capacitor cathode comprising the layer of capacitor cathode material particles mixed with quasi-solid-state electrolyte material particles bonded to the opposing sides of one of the second and third current collector foils.

13. The capacitor-assisted, solid-state lithium-ion battery of claim 6, in which the battery anode electrode includes an asymmetric anode electrode formed of: a layer of particles of active anode material, mixed with particles of an electrolyte, and bonded to one side of one of the current collector foils; and the layer of capacitor anode material particles, mixed with particles of the quasi-solid-state electrolyte, and bonded to the other side of the one of the current collector foils.

14. The capacitor-assisted, solid-state lithium-ion battery of claim 6, in which the battery cathode electrode includes an asymmetric cathode electrode formed of: a layer of particles of active cathode material, mixed with particles of an electrolyte, and bonded to one side of one of the current collector foils; and the layer of capacitor cathode material particles, mixed with particles of the quasi-solid-state electrolyte, and bonded to the other side of the one of the current collector foils.

15. The capacitor-assisted, solid-state lithium-ion battery of claim 6, in which at least one of the first and second layers of particles of electrode material is a mixture comprising particles of capacitor anode material, particles of lithium-ion battery anode material, and particles of a quasi-solid-state electrolyte.

16. The capacitor-assisted, solid-state lithium-ion battery of claim 6, in which at least one of the first and second layers of particles of electrode material is a mixture comprising particles of capacitor cathode material, particles of lithium-ion battery cathode material, and particles of a quasi-solid-state electrolyte.

17. The capacitor-assisted, solid-state lithium-ion battery of claim 6, in which the at least three layers of quasi-solid-state electrolyte each comprises a mixture of lithium bis (fluorosulfonyl) imide and 1-ethyl-3-methyl imidazolium bis(fluorosulfonyl) imide.

18. The capacitor-assisted, solid-state lithium-ion battery of claim 6, in which the at least three layers of quasi-solid-state electrolyte each comprises a mixture of lithium bis (trifluoromethyl sulfonyl) imide-tetraglyme ionic liquid with silica particles or alumina particles.

19. The capacitor-assisted, solid-state lithium-ion battery of claim 6, in which the at least three layers of quasi-solid-state electrolyte each comprises a mixture of lithium hexafluoro phosphate dissolved into propylene carbonate and dimethyl carbonate with one of $Li_7La_3Zr_2O_{12}$ or $Li_{1+x}Al_xGe_{2-x}(PO_4)_3$.

20. The capacitor-assisted, solid-state lithium-ion battery of claim 6, in which the at least three layers of quasi-solid-state electrolyte each comprises: (i) a mixture of $LiClO_4$ in dimethyl sulfoxide with a mixture of poly (methyl acrylate) and poly(ethylene glycol); and/or (ii) lithium bis(trifluoromethane sulfonyl) imide dissolved in [N-ethyl (methyl ether)-N-methyl pyrrolidinium trifluoromethane sulfonimide] [bis(trifluoromethanesulfonyl)imide] with a mixture of poly (vinylidene fluoride) copolymer with hexafluoropropylene.

* * * * *